May 26, 1953  P. N. TRAVIS ET AL  2,639,676
CABLE SUPPORTED PROPELLING DEVICE
Filed Dec. 4, 1950  2 Sheets-Sheet 1

Inventor
Paul N. Travis
Gene A. Garske
Attorney

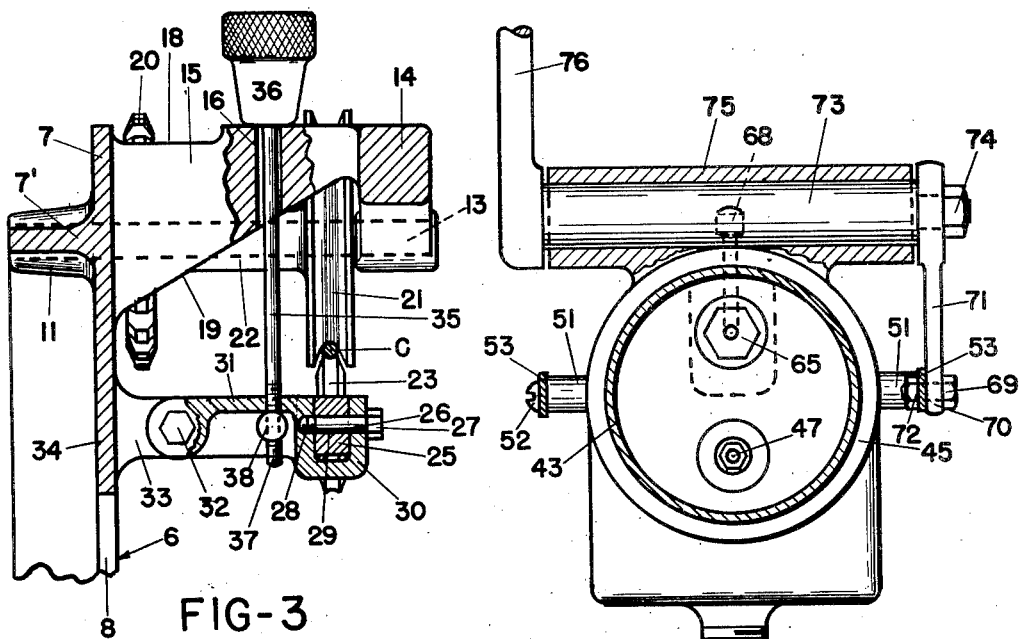
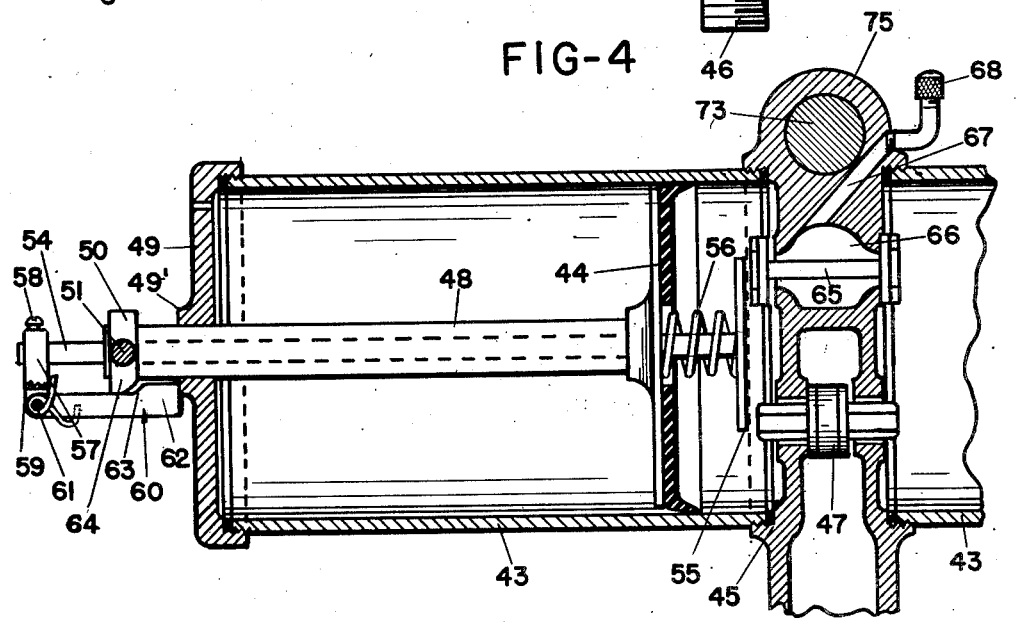

Patented May 26, 1953

2,639,676

UNITED STATES PATENT OFFICE 2,639,676

CABLE SUPPORTED PROPELLING DEVICE

Paul N. Travis and Gene A. Garske,
Spokane, Wash.

Application December 4, 1950, Serial No. 199,030

2 Claims. (Cl. 105—153)

This invention is a cable supported propelling device, and more particularly a device supported upon a cable and adapted to propel a suspended water sprinkler back and forth from end to end of said supporting cable.

One object of the invention lies in the provision of chain driven pulleys adapted to roll upon a supporting cable and journaled on a frame from which a water sprinkler may be suspended.

Another object of the invention lies in the provision of releasable pressure rollers positioned below the driven pulleys which press the supporting cable into the grooved pulleys and prevent slipping of the pulleys on the cable.

Another object of the invention lies in the provision of a powered chain sprocket adapted with a relatively large toothed wheel which is rotated by an oscillating or rocking crank arm having a reversible drive dog pivotally carried on its free end.

Another object of the invention lies in the provision of a water pressure operated reciprocating motor which is adapted to rock the arm and thus impart driving power to the powered chain sprocket through the dog and toothed wheel.

Other objects and advantages of the invention will be apparent during the course of the following description.

Figure 1:
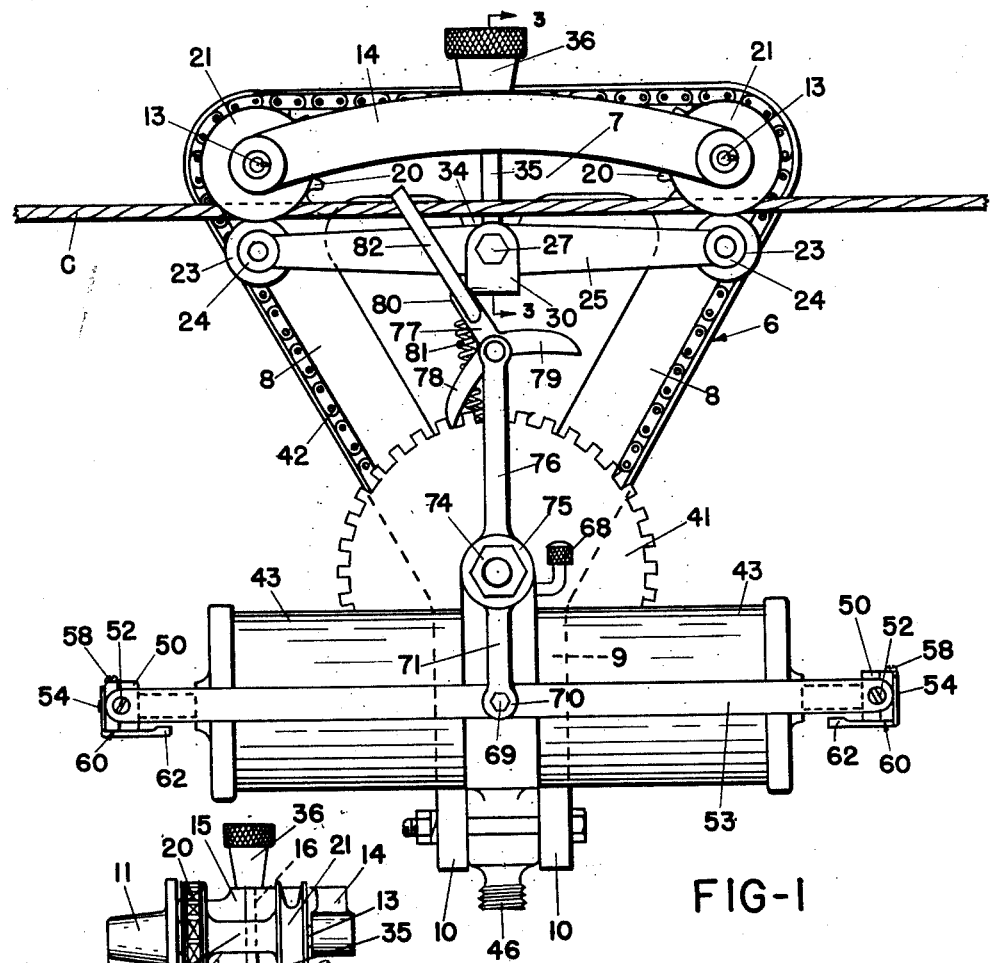
Figure 2:
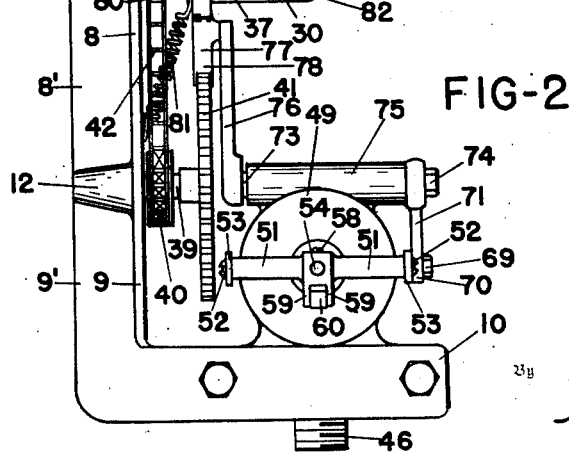

In the accompanying drawings, forming a part of this specification, and in which like numerals are employed to designate like parts throughout the same, Figure 1 is a front elevation of a cable supported propelling device embodying our invention, Figure 2 is a side elevation of the same, Figure 3 is a transverse fragmentary section through the device, taken on line 3—3 of Figure 1, Figure 4 is a transverse cross section through the reciprocating motor and the pivot shaft of the rocking arm, and, Figure 5 is a longitudinal cross section through one end of the reciprocating motor and its central valve arrangement and valve operating mechanism.

To carry out our invention we have provided a frame 6 which is triangular in front elevation and comprises a horizontal cross bar 7 at its top, and downwardly converging side bars 8—8 which meet at a point substantially midway the length of the frame, and merge into a single vertical section 9. Spaced parallel bars 10—10 project forwardly from the lower end of the section 9, and form the motor support. The frame 6 is formed preferably of a light weight metal not materially affected by water, such as aluminum, and the preferred embodiment shown indicates the frame formed by casting. To strengthen the bars 7 and 8 we have formed rearwardly extending ribs 7' and 8' on the rear face thereof and substantially midway their width. A reinforcing rib 9' is also provided on the rear face of the section 9.

Located at the angular upper corners of the frame 6, we have provided bosses 11—11 and at the junction of the two side bars 8—8 another boss 12 is provided. Bosses 11 receive and mount forwardly extending shafts 13—13 and their forward ends are supported in a bar 14 which is arcuate when viewed in front elevation as shown in Fig. 1, but when viewed in plan it will be seen that it is in spaced parallel relation with respect to the top bar 7. The arcuate bar 14 is supported midway its length by means of a bracket 15 which extends forwardly from bar 7 and is formed with a transversely central vertical aperture 16. The top edge face 17 of the bracket is formed with a depression 18 adjacent its base, and its bottom edge face 19 angles upwardly toward its forward end.

Journaled on shafts 13, we have provided sprockets 20—20 and drive pulleys 21—21. Sleeves 22 are disposed between their respective sprocket 20 and drive pulley 21 and are secured thereto thus causing the sprocket and pulley so united to turn as a unit.

A cable C has its ends anchored to spaced supports (not shown) and is stretched taut in spaced relation above the garden or orchard to be watered, and our propelling device is mounted thereon by passing the cable C under the drive pulleys 21. It can be seen that by rotating sprockets 20, rotary motion will be imparted to drive pulleys 21 and they frictionally engage the cable and drive the device thereon. To increase the frictional grip between the drive pulleys and the cable, we have provided pressure wheels 23 which are journaled in the bifurcated ends 24 of a longitudinally tiltable arm 25. To allow for tilting movement of the arm 25, we have provided a transversely extending horizontal pivot pin 26 formed with a head 27 and a threaded end 28 opposed thereto. The arm 25 is provided with a transverse bore 29 substantially midway its length and is adapted to be received in a U-shaped clevis 30 carried by a vertically tiltable arm 31 pivoted at 32 to a lip 33 carried by a tongue 34 positioned midway the length and depending from bar 7.

To releasably secure the arm 31 with pressure wheels 23 engaging cable C we have provided a vertical rod 35 with a hand knob 36 at its upper end and a threaded portion 37 at its lower end. Threaded on the lower end we have provided a transversely positioned cylindrical nut 38 which is disposed beneath arm 31 and the rod 35 rotatably passes through an opening extending vertically through said arm.

Boss 12 is provided with a stub shaft 39 which is securely mounted therein, and the shaft is provided with a pivotally mounted powered sprocket 40 adjacent the frame 6 and in vertical alignment with sprockets 20—20. A toothed wheel 41 is secured on shaft 39 and operably secured to power sprocket 40, and the purpose of the wheel is to receive rotary motion from a water pressure operated motor and transmit this motion to the power sprocket 40 which in turn transmits the motion to sprockets 20 through endless chain 42. The chain 42 is trained about the three sprockets 20—20 and 40 thus causing all sprockets to turn as one when power is applied to the toothed wheel 41.

To apply power to the toothed wheel, we have provided a fluid pressure operated motor which comprises axial aligned cylinders 43—43 and each cylinder is provided with a reciprocating piston 44—44. The inner ends of the cylinders are threaded into a central section 45 which contains the valves necessary to proper functioning of the motor. Fluid under pressure is supplied to the motor preferably through a hose (not shown) connected to a hollow depending threaded boss 46. The fluid is thus directed into the central section 45, and a longitudinally reciprocable valve 47 is positioned to admit fluid under pressure to one or the other cylinder 43.

Figure 5 shows the fluid being directed into the cylinder positioned to the right. Each piston 44 is provided with a tubular piston rod 48 which is secured at its inner end to the piston 44 and has its body reciprocably mounted through the cylinder cap 49 and terminates externally of the cylinder 43. The end of the piston rod 48 is provided with a collar 50 secured thereon and the collar has diametrically opposed horizontal arms 51 extending therefrom and adapted to receive set screws 52 in their ends to secure spaced parallel connecting bars 53 which extend longitudinally of the cylinders 43—43 diametrically opposed thereto and connect the outer ends of tubular piston rods 48.

A longitudinally shiftable shaft 54 is reciprocably mounted in each tubular piston rod 48 and extends beyond the ends thereof. A valve operating plate 55 is mounted on the inner end of shaft 54 and a helical expansion spring 56 is positioned between the plate 55 and its respective piston 44. The opposite end of each shaft 54 extends from the end of its piston rod 48 and is provided with a collar 57 secured thereon by set screw 58. Spaced depending ears 59 are provided on collars 57 and spring raised arms 60 are pivotally mounted therebetween by a pin 61 which passes through ears 59 and one end of arm 60 transversely thereof.

The arm 60 is provided with a head 62 and a cam face 63 on the upper side thereof. The piston rod collar 50 is provided with a cam 64 at its lower side which cooperates with cam 63 to cause the valve operating mechanism to function.

Central section 45 is provided with an exhaust valve 65 which in reality is two valves ganged by a connecting rod, and the purpose of the exhaust valve 65 is to exhaust fluid from one cylinder while the other is being filled. Fluid passing from cylinders 43 through exhaust valve 65 enters a cavity 66 from which leads a port 67 controlled by a thumb operated needle valve 68. By controlling the exhaust of fluid from the cylinders, the speed of the motor operation may be controlled.

As fluid under pressure enters one cylinder 43 by valve 47, piston 44 is moved rearwardly and this in turn draws the opposed piston 44 forwardly by means of the connecting bars 53.

Fluid in front of the forwardly drawn piston is exhausted by valve 65 and the rate of flow is adjusted by needle valve 68 to control the speed of the pistons.

When the pistons near the end of their stroke in one direction (as shown in Figure 5) the head 62 of arm 60 contacts the collar 49' of cap 49 and shaft 54 stops. Piston 44 continues to move, compressing spring 56 and when cam 64 strikes cam 63, the arm is pivoted downwardly until the head 62 disengages collar 49' and spring 56 causes the shaft and plate to snap forwardly striking valves 47 and 65 and reversing their open and closed ports to the opposite cylinders. This action reverses the movement of the pistons and they continue to reciprocate as long as fluid under pressure is supplied.

The front connecting bar 53 is provided with an aperture midway its length and a bolt 69 passes through an eye 70 of a rocker arm 71 and the aperture where it is loosely secured by nut 72. As connecting bar 53 reciprocates, rocker arm 71 is rocked and its end opposed to the eye 70 is secured to one end of a transverse shaft 73 by means of a nut 74 so that oscillating motion is imparted to the shaft as the pistons reciprocate. The shaft 73 is rotatably mounted through a transverse sleeve 75 formed integral with and positioned above the central section 45.

An oscillating crank arm 76 is secured to the end of shaft 73 opposed to rocker arm 71 and extends from the arm in an opposed parallel direction with relation to arm 71. A reversible drive dog 77 is pivotally mounted on the end of crank arm 76 and this dog comprises two angularly related dog teeth 78 and 79 and an operating tooth 80. A contracting spring 81 is secured to the operating tooth 80 at one of its ends and to the frame 6 at the other and thus causes the dog to operate as a toggle. An angular finger 82 is secured to the operating tooth and extends upwardly with its free end disposed adjacent the cable so that a stop (not shown) secured on and extending in spaced parallel relation to the cable may be placed to contact the finger and cause the dog to reverse and thus reverse the direction of power application to the toothed wheel 41 by lowering tooth 79 into operating engagement therewith while tooth 78 is raised. When crank arm 76 oscillates in a direction opposed to the dog 77 or 78 which for the time being is in operating engagement with the wheel, it ratchets back across the teeth of toothed wheel 41 and locks behind a selected tooth at the end of its stroke.

The wheel 41 is thus successively rotated in one direction and rotary motion is imparted to pulleys 21 and the propelling device is moved along the cable.

A sprinkler may be supported beneath the device by means of hooks or other means and it will thus be propelled back and forth across a field which is to be watered.

Having thus described our invention, we claim:

1. A propelling device comprising a frame, drive pulleys journalled on the frame and adapted to frictionally engage a monorail and having power transmission means associated therewith, a toothed wheel journalled on said frame and adapted to actuate said power transmission means, a crank arm oscillated by a fluid pressure motor carried by said frame, a spring held reversible drive dog pivotally mounted on the free end of said crank arm and disposed to rotate said toothed wheel, and means adapted to pivot said dog whereby the direction of rotation of said toothed wheel may be reversed.

2. A propelling device comprising a frame, drive pulleys journaled on the frame and adapted to frictionally engage a monorail, means for driving said pulleys, a vertically tiltable arm carried by said frame midway between said pulleys, a U-shaped clevis on the free end of said arm, a rockable arm pivotally mounted in said clevis, pressure wheels carried by the ends of said rockable arm and disposed one below each said pulley, and means adapted to draw said tiltable arm upwardly, whereby the pressure wheels increase the frictional engagement of said pulleys.

PAUL N. TRAVIS.
GENE A. GARSKE.

References Cited in the file of this patent

UNITED STATES PATENTS

| Number | Name | Date |
|---|---|---|
| 671,505 | Winsor | Apr. 9, 1901 |
| 1,801,001 | Henderson | Apr. 14, 1931 |